J. Q. ADAMS.
STRAW AND COB ELEVATOR.

No. 176,916.

Patented May 2, 1876.

WITNESSES

INVENTOR

UNITED STATES PATENT OFFICE.

JOHN Q. ADAMS, OF MARSEILLES, ILLINOIS.

IMPROVEMENT IN STRAW AND COB ELEVATORS.

Specification forming part of Letters Patent No. 176,916, dated May 2, 1876; application filed March 29, 1875.

*To all whom it may concern:*

Be it known that I, JOHN Q. ADAMS, of Marseilles, in the county of La Salle and State of Illinois, have invented certain new and useful Improvements in Elevators for Corn-Cobs, Straw, Grain, &c.; and I do hereby declare the following to be a full and exact description of the same, reference being had to the accompanying drawings, forming part of this specification, in which—

Figure 1:
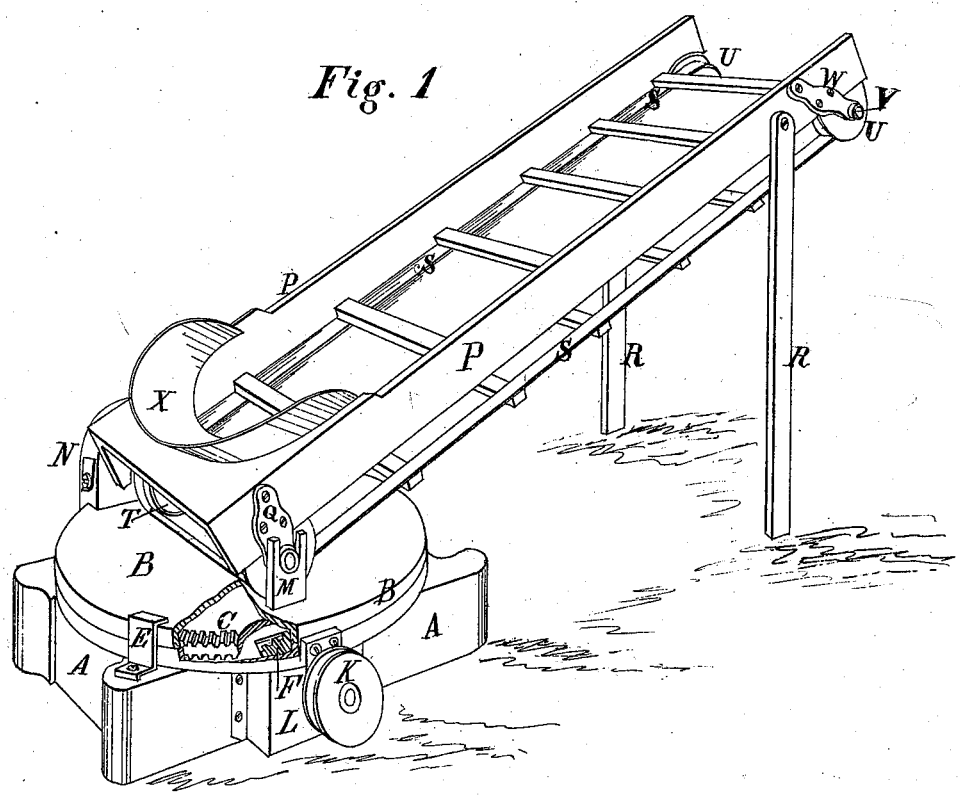
Figure 2:
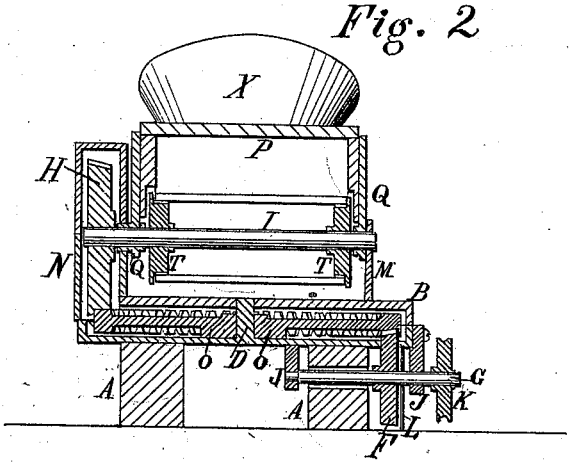

Figure 1 is a perspective view of my improved elevator, partly broken away to show the arrangement of the gearing; and Fig. 2 is a transverse vertical section through the gearing and base of the elevator-frame.

Similar letters of reference in the accompanying drawings denote the same parts.

My invention has for its object to provide an improved elevator for general purposes, such as the stacking of corn-cobs, the elevation of grain, hay, straw, &c., which can be adjusted vertically and horizontally upon its supporting-frame and driving mechanism without interfering with or discontinuing its operation.

My invention consists in certain details of construction in an elevator, more fully set forth and particularly claimed herein.

In the accompanying drawings, A is the base-frame, composed of strong timbers, and B is the horizontal inclosing-case mounted thereon to receive the large crown-wheel C. The case is composed of two parts, the lower one being bolted to the timbers, and provided with a short vertical shaft, D, in the center, upon which the crown-wheel is mounted. The upper half of the case is centered upon this shaft, so as to turn freely, and is guided by the side flanges composing the edges of the case. E are angular guides secured to the base-timbers, and extending over the top of the case to hold the two parts thereof in position, as shown in Fig. 1. The two parts thus united completely inclose the crown-wheel, and effectually exclude the dirt therefrom when the machine is in operation. The crown-wheel is made double, the teeth upon its under side engaging with a beveled pinion, F, projecting through the lower part of the case at one edge, and mounted upon a horizontal shaft, G, in the side of the frame, and the teeth upon its upper side engaging with a large beveled pinion, H, projecting through the upper part of the case at one edge, and mounted upon a horizontal shaft, I, having its bearings upon such upper part of the case, as shown. The shaft G has its bearings in the brackets or hangers J J, depending from the lower half of the inclosing-case, as shown in Fig. 2, and is provided with a pulley, K, by which the power is applied to drive the gearing. A case, L, secured to one of the base-timbers beneath the case incloses the pinion F, and serves as a shield to exclude dirt and other foreign substances therefrom. One of bearings of the shaft I is formed of an upright, M, upon the top of the case near one edge, and the other is formed in the inner side of a box, N, secured by suitable means to the opposite edge of the top, so as to receive the pinion H. This case is also provided with a hinged cover, secured in place by proper catches, to protect the pinion from dirt or other matter that might otherwise fall upon it, and at the same time hold the pinion in mesh. The eye of the double crown-wheel is surrounded upon the under side with a large wide boss, O, which furnishes bearing for such wheel, and holds its teeth out of contact with the lower half of the case. The crown-wheel does not depend upon the hub for holding it steady; but the space between the ends of the cogs and either the upper or under side of the case is designed to be so made that if the wheel springs off the pinion F the case will act as a slide at any point to hold it in gear. P is a long elevator-frame, formed of one or more sections. The lower end is mounted upon the shaft I by means of side brackets Q, so as to turn freely, and its outer end is provided with pivoted legs R, by which it is supported upon the ground. S S are endless carrying-belts, connected by cross-bars, and extending around flanged rollers T T upon the shaft I, and corresponding rollers U U upon a shaft, V, mounted in brackets or hangers W at the outer end of the elevator-frame. These belts and cross-bars constitute the elevator in connection with the side pieces and the bottom of the frame, the cross-bars sweeping over such bottom in the ordinary manner. The lower end of the elevator-frame is provided with a curved metallic hopper, X, which receives the substance to be elevated, and feeds it to the carrying-belts and bottom of the frame.

When the machine is to be operated the elevator is first fixed at the proper inclination by turning it upon the shaft I and adjusting the position of the pivoted legs. Power is then applied to the pulley K, to operate the pinion F and drive the crown-wheel within the inclosing-case, the crown-wheel, in its turn, driving the pinion H upon the shaft I, and thus operating the carrying-belts to elevate the material fed upon them, as will be readily understood.

The journaled top of the inclosing-case not only supports the elevator, but allows it to swing from side to side to change its position laterally, whether the machine is in operation or at rest.

Having thus described my invention, what I claim as new is—

1. The elevator-frame P, carrying the endless belts S S, and provided with the supporting-legs R R and brackets Q Q, in combination with the shaft I, operated from the double crown-wheel C through the medium of the pinion H, and supported in bearings secured to the movable top of the case B, for the purpose of adjusting the elevating frame and belts, substantially as described.

2. In an elevator of the form described, the double crown-wheel, with boss O, meshing into the pinions F and H, the closely-fitting case B, the upper part movable upon the lower and held thereto by clamps, all constructed and operating together as and for the purpose set forth.

3. In the described elevator, the closed case, made in two parts, an upper and lower, the former moving freely on the latter, but closely fitting thereto, and carrying the casing N, covering the pinion H, as and for the purpose set forth.

4. The closed casing B, carrying the crown-wheel, on which is fixed the standard M, the casing N, the inner side of which furnishes bearing for one end of the shaft I, and the brackets Q Q, resting on the shaft, and supporting the elevator-frame, all constructed and operating as and for the purposes set forth.

5. The covered box N, combined with the pivoted top of the case B, to form one bearing for the shaft I, and a protecting-case for the pinion H thereon, substantially as described.

JOHN Q. ADAMS.

Witnesses:
H. R. ADAMS,
CHAS. N. WARD.